No. 675,447. Patented June 4, 1901.
J. M. McMAHON.
INSULATING PIPES.
(Application filed Jan. 26, 1901.)
(No Model.) 5 Sheets—Sheet 2.
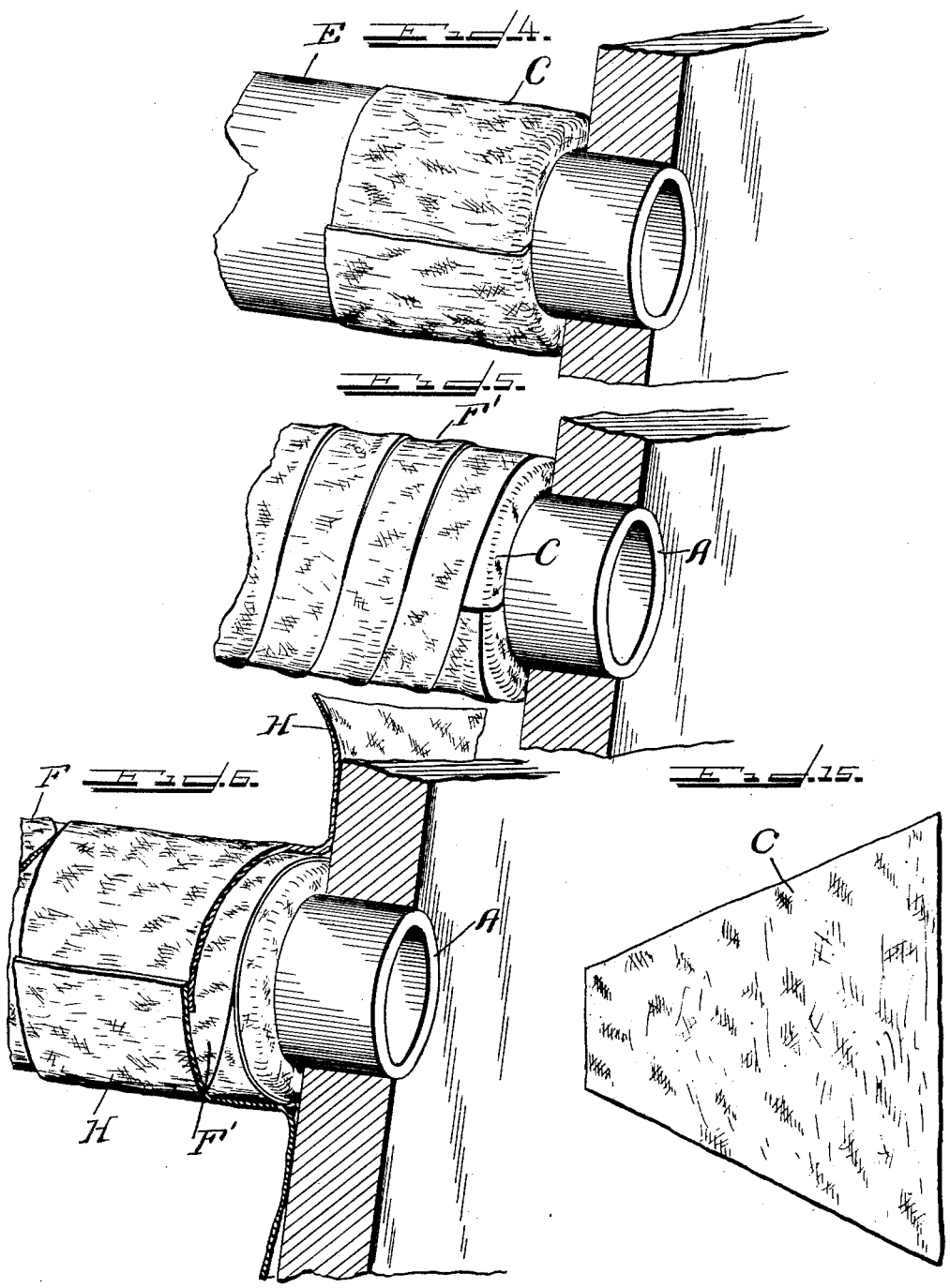

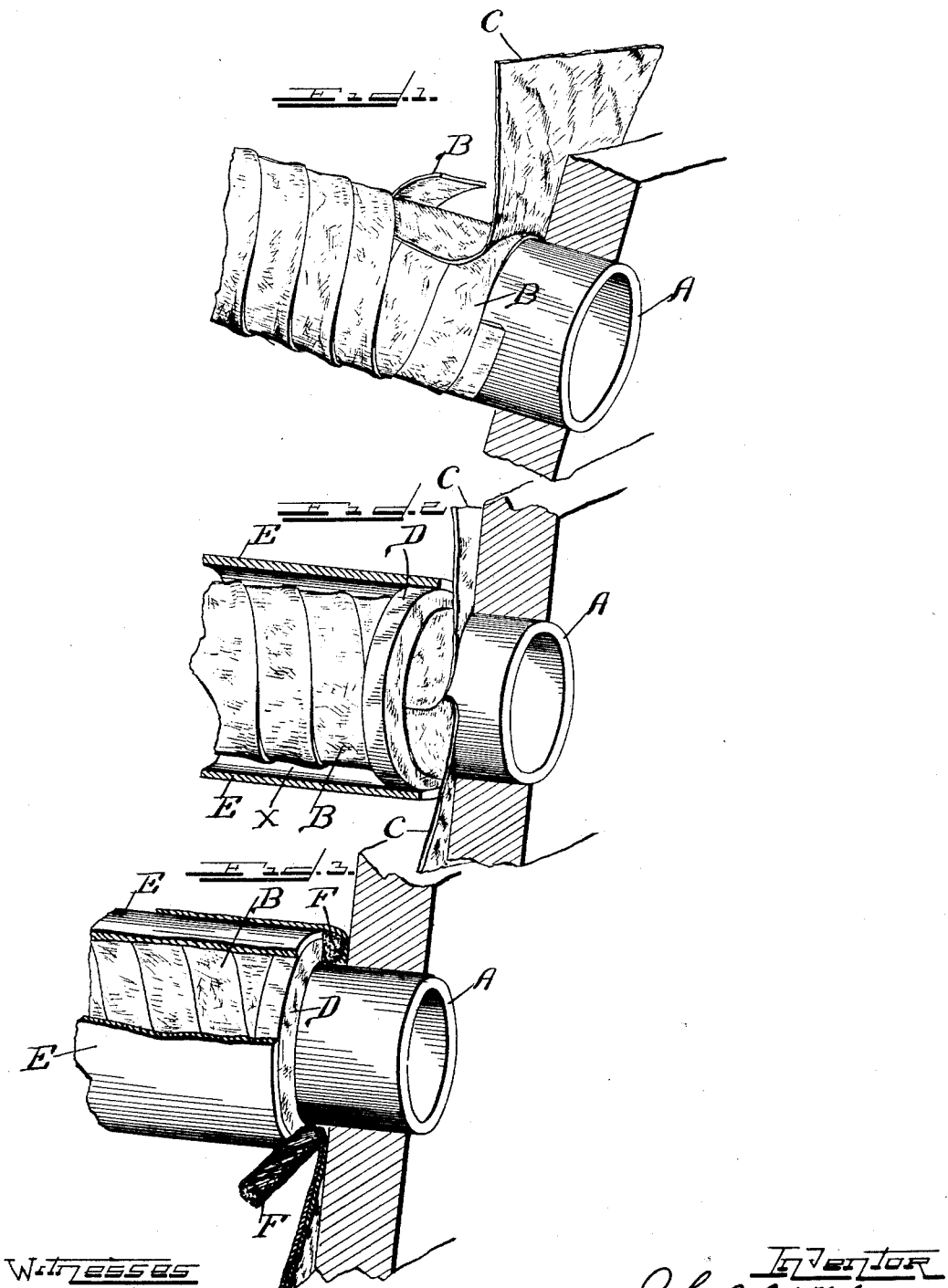

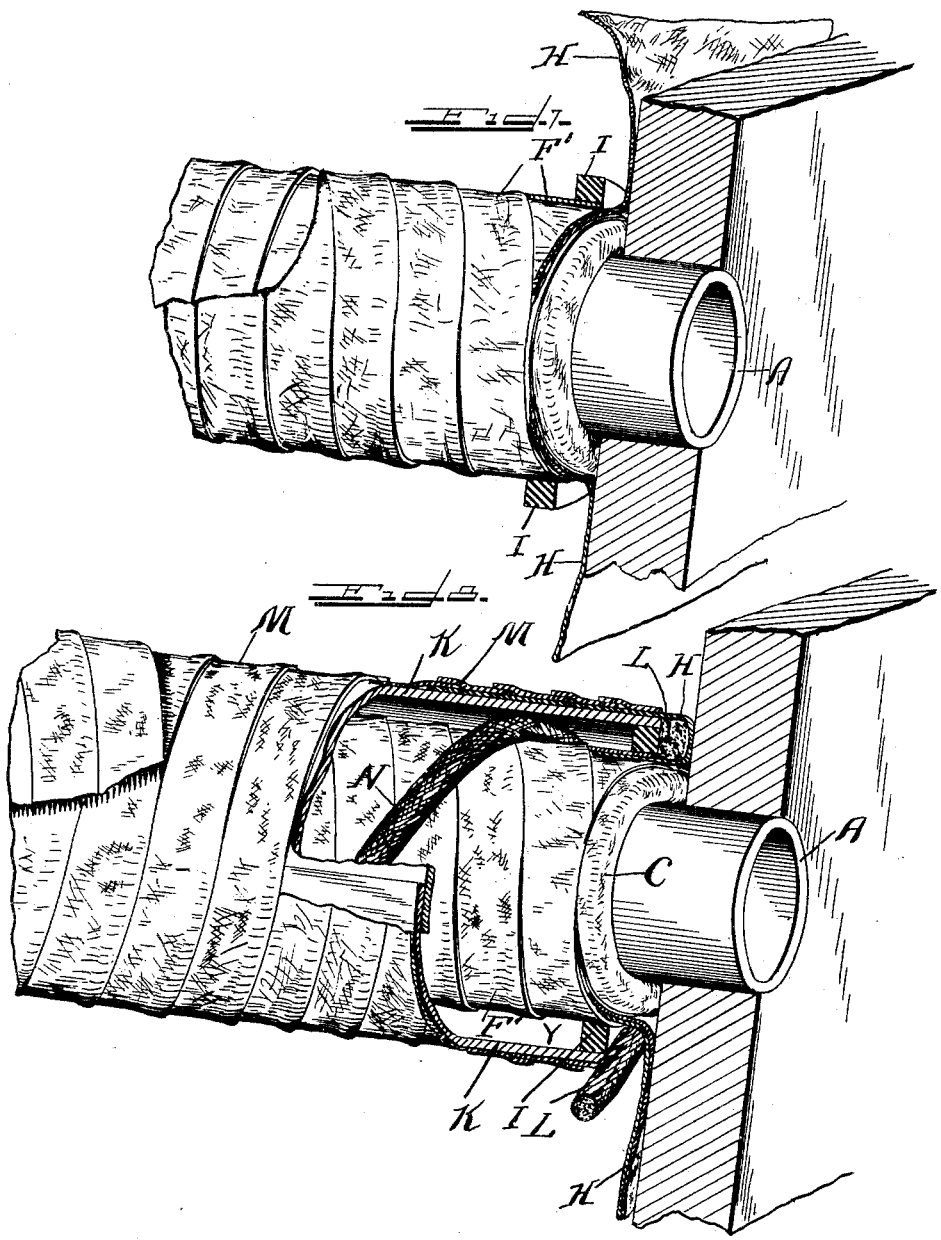

No. 675,447. Patented June 4, 1901.
J. M. McMAHON.
INSULATING PIPES.
(Application filed Jan. 26, 1901.)
(No Model.) 5 Sheets—Sheet 4.
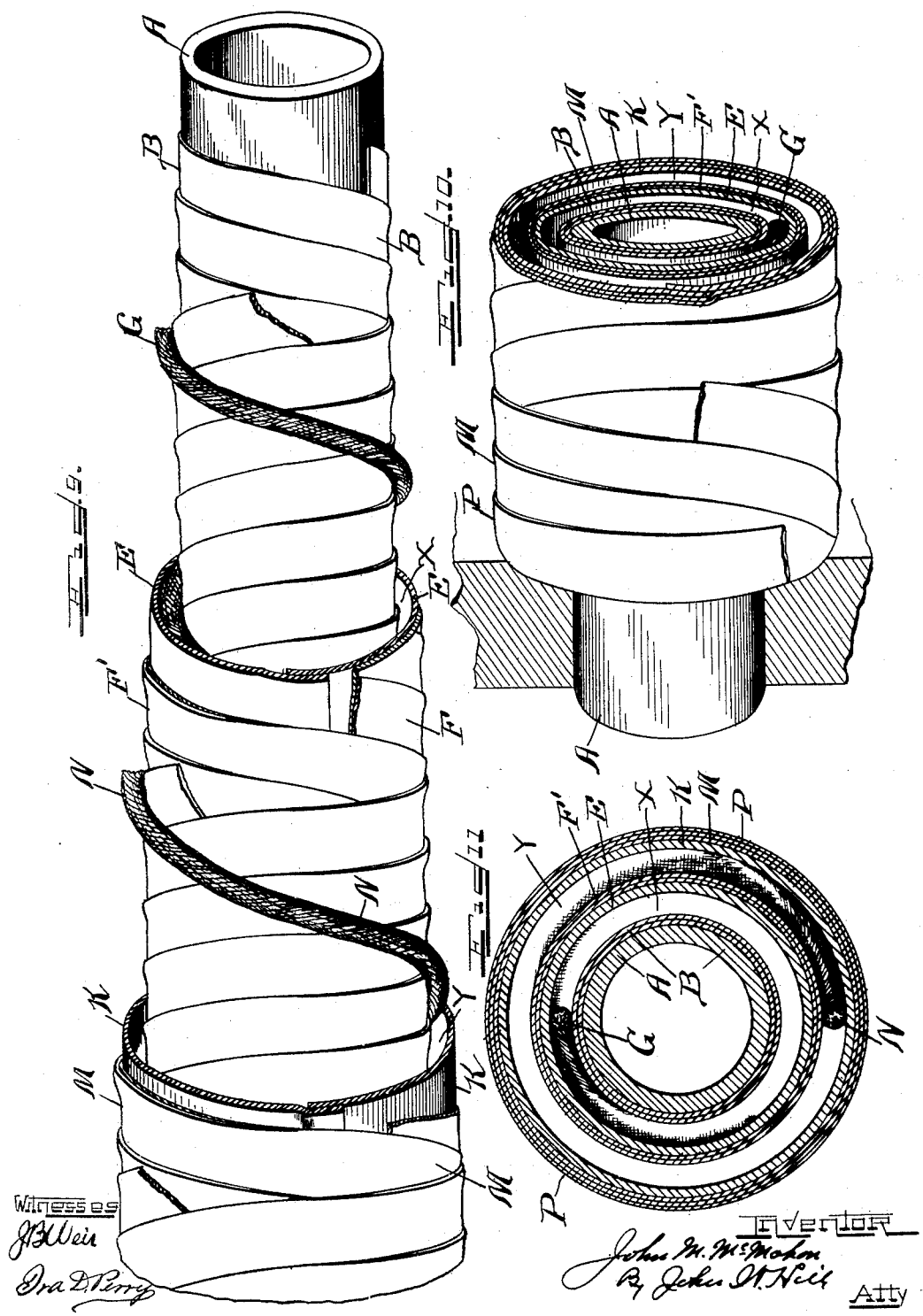

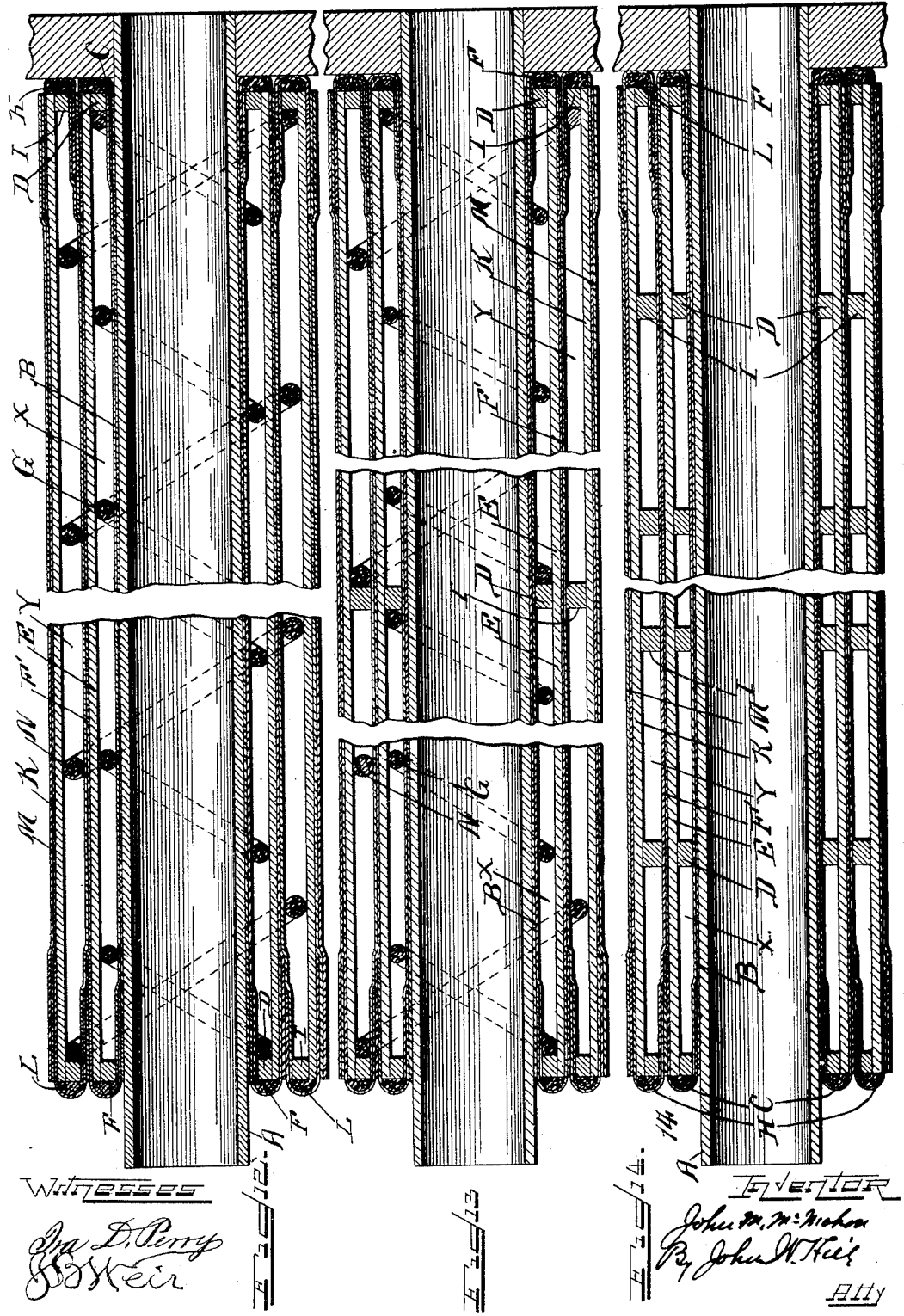

UNITED STATES PATENT OFFICE.

JOHN M. McMAHON, OF OMAHA, NEBRASKA.

INSULATING PIPES.

SPECIFICATION forming part of Letters Patent No. 675,447, dated June 4, 1901.

Application filed January 26, 1901. Serial No. 44,807. (No model.)

*To all whom it may concern:*

Be it known that I, JOHN M. MCMAHON, a citizen of the United States of America, residing at Omaha, in the county of Douglas and State of Nebraska, have invented certain new and useful Improvements in Insulating Pipes, of which the following is a description.

The object of my invention is to provide pipes conducting brine and ammonia as well as other material of low temperature with an insulation that will prevent the escape of the cold, and thus obviate the condensation, sweating, and kindred effects caused by differences of temperature resulting in the rapid destruction of both insulating means and the pipes themselves.

To this end my invention consists in the novel method and arrangement of the insulating means as well as the novel combination of the several parts.

In the drawings, wherein like reference-letters indicate like or corresponding parts, Figure 1 is a perspective view of the end of a pipe, showing the first step in my invention. Fig. 2 is a similar view showing the spacing means at the ends of the pipe. Fig. 3 is a similar view showing the means for closing and sealing the air-chamber at the end of the pipe. Figs. 4, 5, and 6 are similar views showing the steps taken in effectually closing and sealing the dead-air chamber or chambers. Figs. 7 and 8 are similar views showing the steps taken where it is desired to employ a plurality of layers of dead-air chambers one upon the other. Fig. 9 is a similar view showing a section of insulated pipes with parts of the several wrappings broken away to show the method employed where a plurality of layers of dead-air chambers are employed. Fig. 10 is a similar view in partial section. Fig. 11 is a transverse section of the same. Fig. 12 is a longitudinal section of a pipe insulated with two layers of air-chambers, the spacing of the chambers being maintained by windings of cord, rope, or other equivalent. Fig. 13 is a similar view showing each layer of dead-air chambers divided into sections by interposed walls or rings resulting in a plurality of independent dead-air chambers in each layer. Fig. 14 is a similar view in which the windings of rope or its equivalent for spacing are dispensed with, the chambers being divided by rings or walls arranged sufficiently near one another to support the outer casing and maintain the chamber, thus forming a plurality of comparatively small dead-air chambers in each layer; and Fig. 15 shows the preferred form of sealing fabric at the ends of the pipe.

In the drawings, A represents the pipe. In insulating this I prefer to first wrap or wind the same with a strip or ribbon B of suitable material saturated with an adhesive flexible compound which will not permit the passage of air. To secure the best results the compound should also be a non-conductor. In practice I have had good results by using a compound composed of substantially one part of mica, one part of plumbago, and three parts of soapstone, powdered and mixed with sufficient coal-tar or other liquid bituminous substance to give the consistency desired. I do not limit myself, however, to this compound, as any compound which will not permit the passage of air and possessing the qualities which will resist the temperature contemplated and at the same time has sufficient adhesiveness, flexibility, and elasticity may be used with good results. As before stated, the ribbon B is thoroughly saturated with compound and is then wound tightly around the pipe, its edges overlapping one another, as shown. After the ribbon B is wound to a point near the pipe connection with the vat, tank, or other part a short section of fabric C is wrapped about the pipe, with its outer end free, as shown. This fabric may be of cotton, linen, or other equivalent material and is preferably trapezoidal in form, with its base free to cause a fullness, hereinafter explained. The ribbon B is preferably then rewound, firmly binding the narrower end of the fabric in position on the pipe, which it encircles. This provides the pipe with a double layer of saturated ribbon, which may be increased to several thickness of the ribbon, depending upon the extent of the lap of the ribbon in winding. At or near the end of the ribbon wrapping and the fabric a spacing-ring D, of any suitable material, encircles the pipe, ribbon, and end of the cloth and may be secured in position in any suitable way. (See Figs. 2 and 3.) After this is done a layer of heavy straw or tar board E or its equivalent, extending from one ring to another, (see Figs. 12 and 14,) is wrapped about the whole, forming a dead-air space around the pipe between the rings. After this is done oakum or equivalent material F, thoroughly saturated with the same or a similar compound, is tightly wound around the pipe between the ring D and the adjacent wall of the tank or other part, thoroughly covering and enveloping the short portion of the pipe. The free end of the fabric C is then turned backward over the saturated oakum and upon the covering E, its fullness permitting it to be tightly wrapped around the same, as shown in Fig. 4. In the preferred form the fabric is also saturated with the compound, the object being to firmly close and thoroughly seal the dead-air chamber at the end of the pipe. This feature of my invention may be modified to quite an extent so long as the primary object of thoroughly sealing the end of the air-chamber is accomplished. After this is done another wrapping, with a saturated strip or ribbon F' similar to the ribbon B, may be tightly wrapped around the covering E, the several layers overlapping to thoroughly seal the exterior covering of the air-chamber. In practice a plurality of these wrappings are employed to render the air-chamber thoroughly air-tight. By this means one or more air-tight air-chambers may be formed about the pipe, thoroughly insulating the same and preventing undue condensation. In the preferred form a cord or rope G or its equivalent is wound about the pipe upon the wrapping B, extending from one ring D to another, the several coils being separated, as shown, the object being to thoroughly space the air-chamber to prevent the accidental crushing or collapsing of the same in hanging the pipes, &c. (See Fig. 9.)

The rings D may be positioned along the pipe as desired, dividing the dead-air chamber into a plurality of dead-air chambers extending longitudinally of the pipe, as shown in Figs. 12, 13, and 14. In some cases—as, for example, in a vertical pipe—the individual dead-air chambers may be comparatively short and the cord or rope be omitted, as shown in Fig. 14. In other cases the rings D may be positioned at a convenient distance from one another and the winding of the cord or rope G extended from one to the other, as shown in Fig. 13.

In some cases where there is a great difference between the temperature of the material conducted in the pipe and that of the atmosphere a plurality of layers of dead-air chambers may be employed, one being arranged without the other, resulting in a series of annular air-tight dead-air chambers, one nested within another. For example, upon the first wrapping of the ribbon F' a second piece of fabric H may be inserted, as before, and bound in position by the return wrapping of the ribbon F. (See Figs. 6 and 7.) A second ring I is then secured in position and a layer of heavy tarboard K wrapped about the pipe, as before. The saturated oakum L is again wrapped between the ring and the adjoining wall and the fabric H turned back upon board K, the same as before, and firmly bound in position by another wrapping of saturated ribbon M, forming another air-chamber or other chambers outside the first. The rope or cord N for spacing purposes may be employed, as before. (See Fig. 8.) This operation may be repeated as desired, depending upon the temperature and bulk of the material conducted in the pipe and the temperature of the atmosphere. After the pipe is properly insulated as desired a wrapping of canvas or other preferred material may be employed to give a finish to the whole.

It will be seen that my improved method contemplates, first, the formation of an air-tight dead-air chamber about the pipe; second, that this air-chamber, if preferred, may be divided into several independent air-tight air-chambers extending along the pipe, by means of which an injury to one will not affect the balance of the chambers, and the injured chamber may be easily repaired; third, that the dead-air chambers may be spaced by a spiral winding of rope, cord, or other equivalent material, preventing crushing or injury from blows, and, fourth, that the layers of air-chambers may be multiplied as desired, depending upon the medium passing through the pipe and the necessities of the case.

It is obvious such modifications as the number and size of the air-chambers, the order and thickness of the several layers of material, and the compound employed may be made without departing from the spirit of my invention.

I am aware of the magnesia covering for steam-pipe and that arrangement is made for a space between the covering and the pipe, but such space is not air-tight. In use upon steam-pipe there is not the necessity for an absolutely air-tight chamber as there is upon brine and ammonia pipes, where the medium is of low temperature, causing condensation and sweating and consequent rapid destruction of the packing and pipes as well as the dripping met with where such pipes are located.

It is obvious that by my improved method of insulation the dead-air chambers may be as effectually maintained about the bends and angles of the pipe as on a straight run. This feature is important and is not possible with inflexible coverings which have heretofore been employed with steam-pipes.

By the term "flexible material" in the claims I wish to be understood as including material possessing also sufficient elasticity to permit the expansion and contraction met with in structures of the kind contemplated.

Having thus described my invention, what I claim is—

1. An insulated low-temperature pipe comprising a pipe first wound with a strip or ribbon saturated in adhesive flexible, air-excluding compound, second, spacing and supporting means encircling the pipe upon said material to form one or more dead-air chambers; third, a material saturated with adhesive flexible, air-excluding compound without the spacing means, and surrounding said pipe, and means for sealing the ends of the air-chamber thus formed.

2. An insulated low-temperature pipe, comprising a pipe wound with a saturated ribbon B, spacing-rings D, encircling the pipe without the ribbon, covering material E without the rings and encircling the pipe, the ribbon F saturated with a flexible air-excluding compound wrapped around said covering material, and means for sealing the ends of the air-chamber thus formed.

3. An insulated low-temperature pipe comprising a pipe encircled by spacing-rings D and spacing and supporting material G wound spirally around said pipe, a covering of material saturated with adhesive elastic air-excluding compound encircling the pipe, without said rings and spacing means, and means for sealing the ends of the air-chamber thus formed.

4. An insulated low-temperature pipe consisting of a pipe encircled by spacing means D and a covering E to form a dead-air chamber, in combination with a flexible material C, packing material F saturated with adhesive flexible air-excluding compound filling the space between said ring and the adjoining wall or receptacle, said flexible material C being turned over said packing material and upon the covering E and secured thereto by a suitable wrapping, the whole tending to seal the end of the air-chamber around said pipe.

5. An insulated low-temperature pipe, comprising a pipe surrounded by an annular air-chamber wrapped with a ribbon saturated with an adhesive, elastic, non-conducting air-excluding compound, thoroughly sealing the air-chamber longitudinally, in combination with a wrapping of absorptive material saturated with similar compound arranged around the pipe at the ends of the chamber, and means for securing the same in such position thereby thoroughly sealing the ends of the air-chamber and rendering it air-tight.

6. An insulated low-temperature pipe, comprising a pipe surrounded by an annular chamber wrapped with a strip or ribbon of tar-paper saturated with an adhesive, elastic, non-conducting, air-excluding compound, thoroughly sealing the air-chamber longitudinally, in combination with a wrapping of oakum saturated with similar compound, arranged around the pipe at the ends of the chamber, and a fabric similarly saturated inclosing the oakum and binding the same in position, thereby thoroughly sealing the ends of the air-chamber and rendering it air-tight.

In testimony whereof I have signed this specification in presence of two witnesses.

JOHN M. McMAHON.

Witnesses:
JOHN W. HILL,
JOHN H. BERKSTRESSER.